Figure 4:
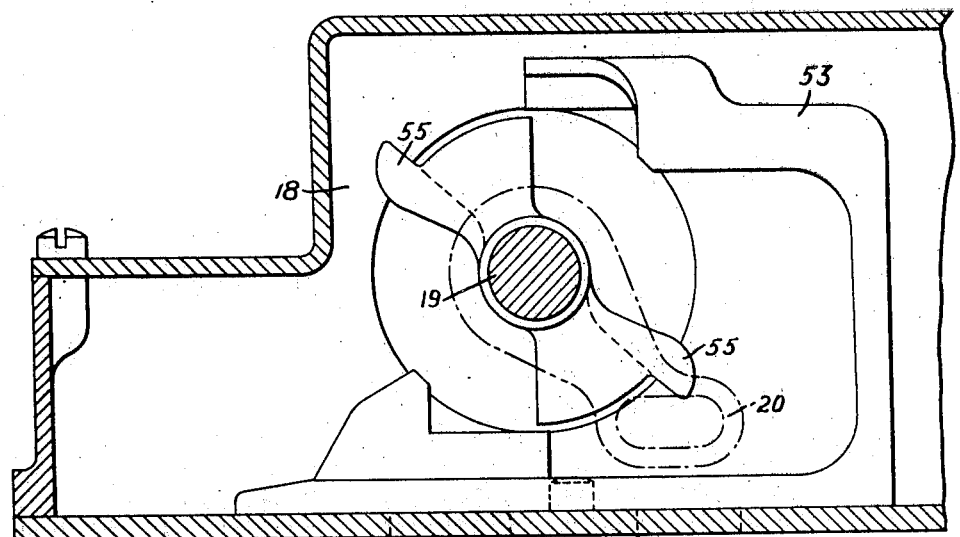

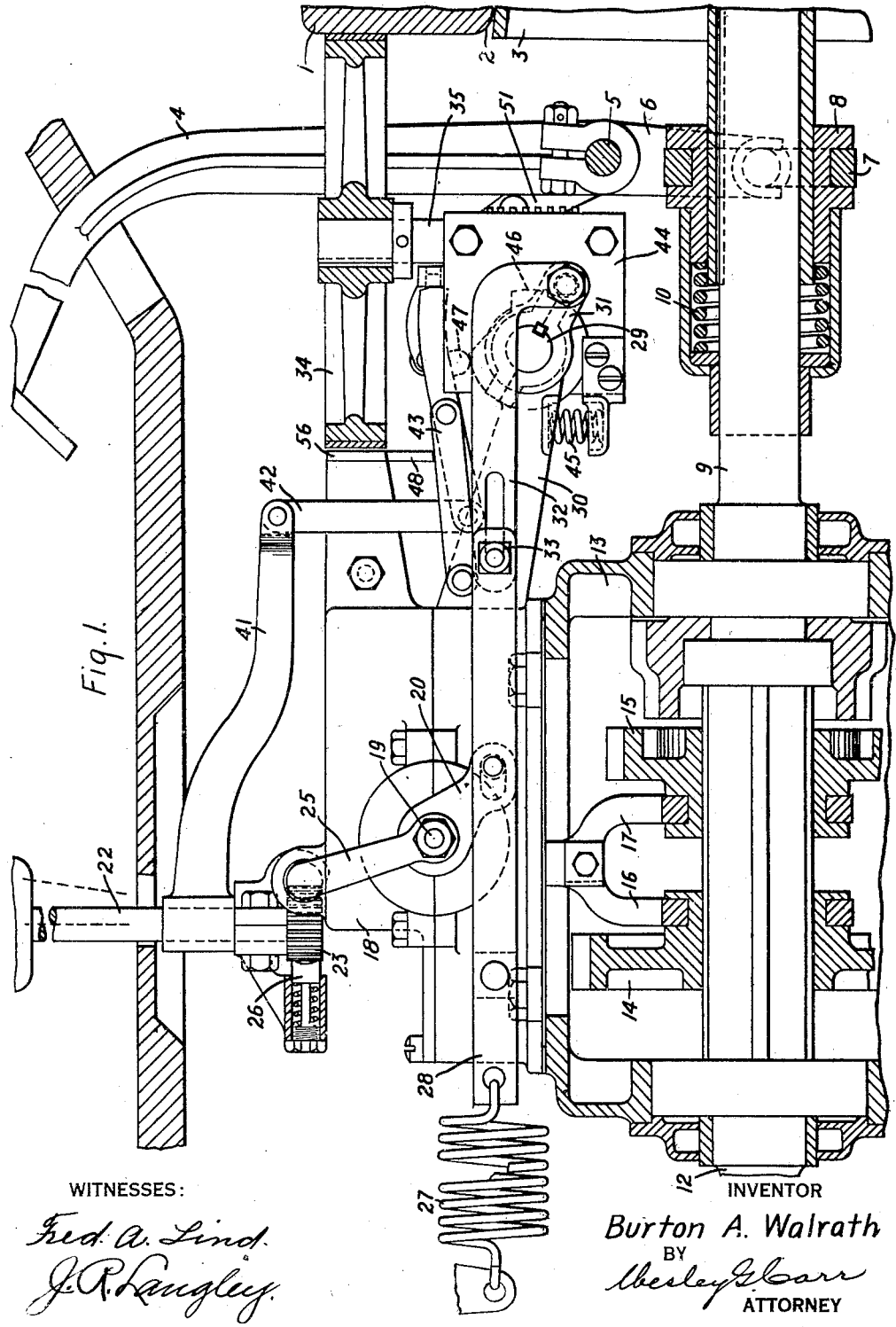

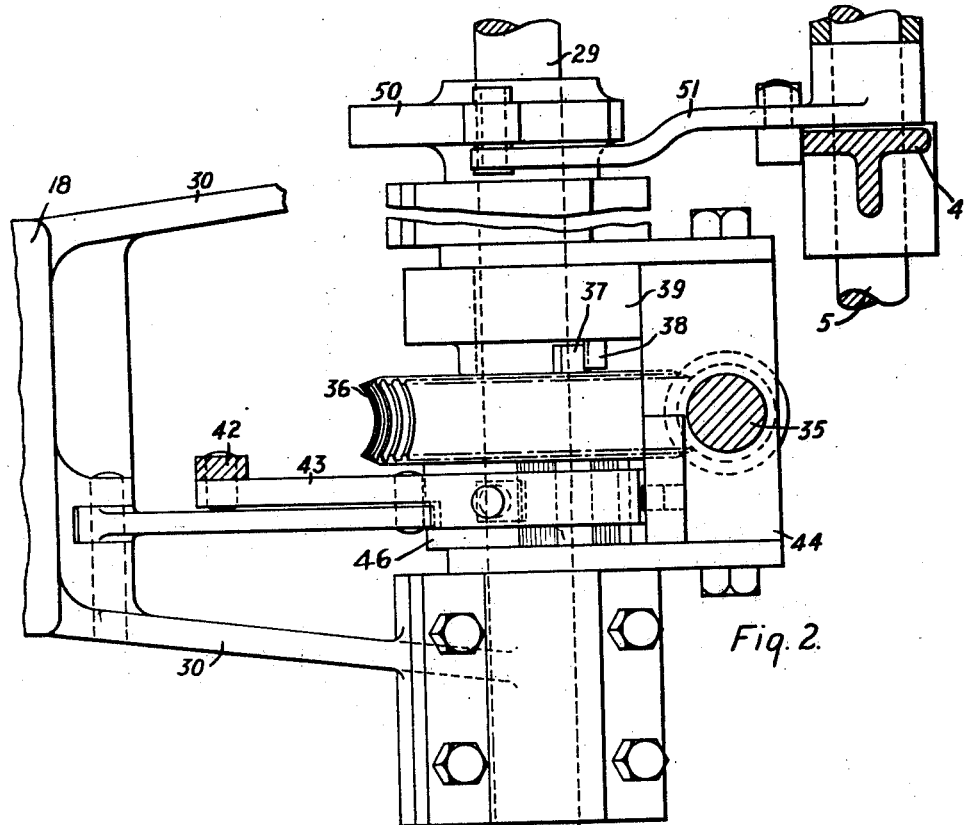
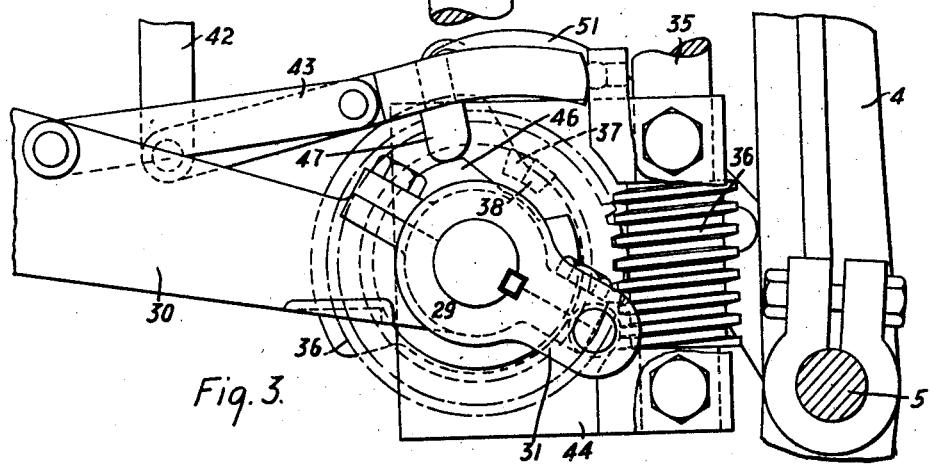

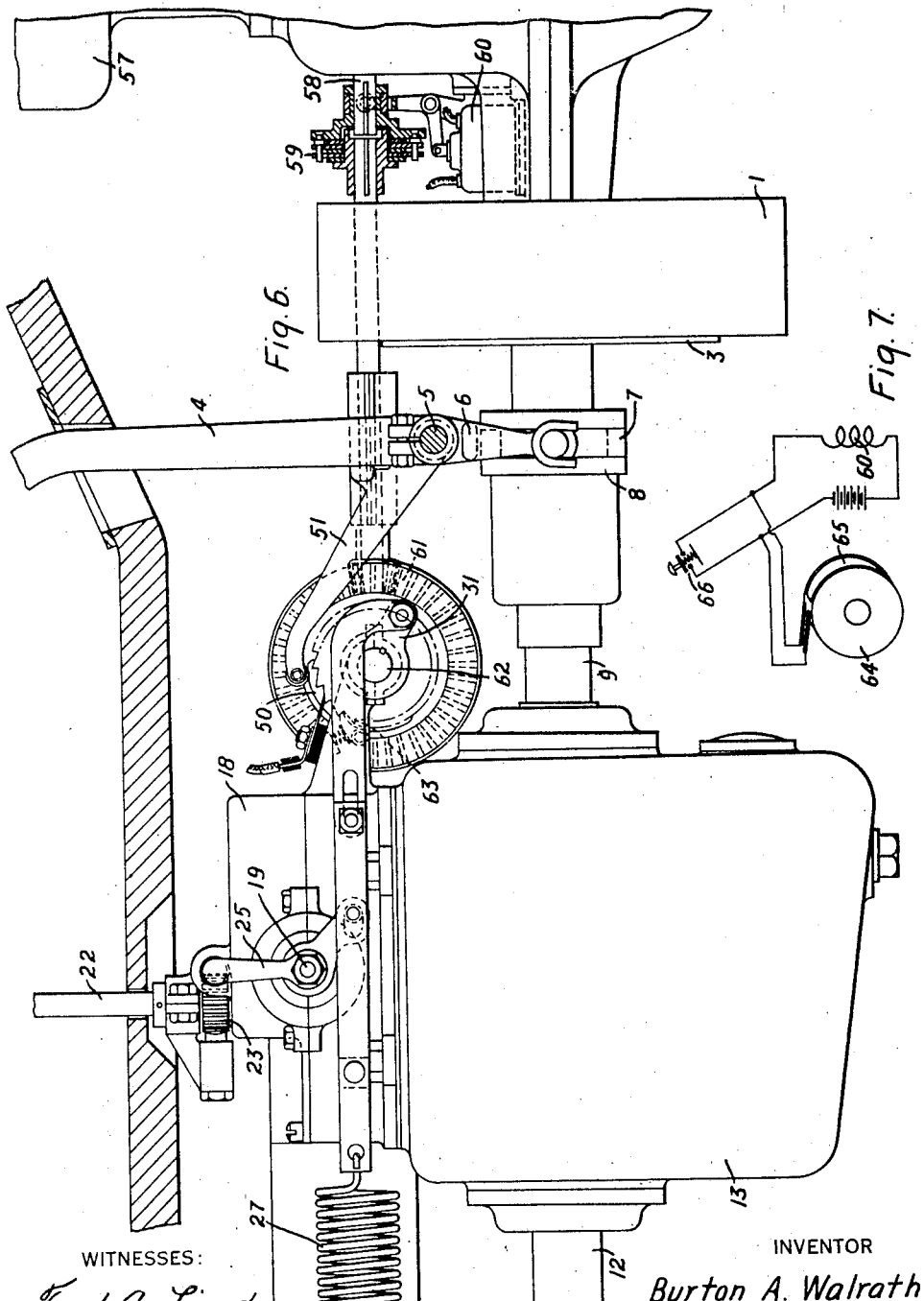

B. A. WALRATH.
GEAR SHIFTING MECHANISM.
APPLICATION FILED JAN. 5, 1917.

1,371,531.

Patented Mar. 15, 1921.
6 SHEETS—SHEET 5.

WITNESSES:
Fred. A. Lind
J. R. Langley

INVENTOR
Burton A. Walrath
BY
Wesley G. Carr
ATTORNEY

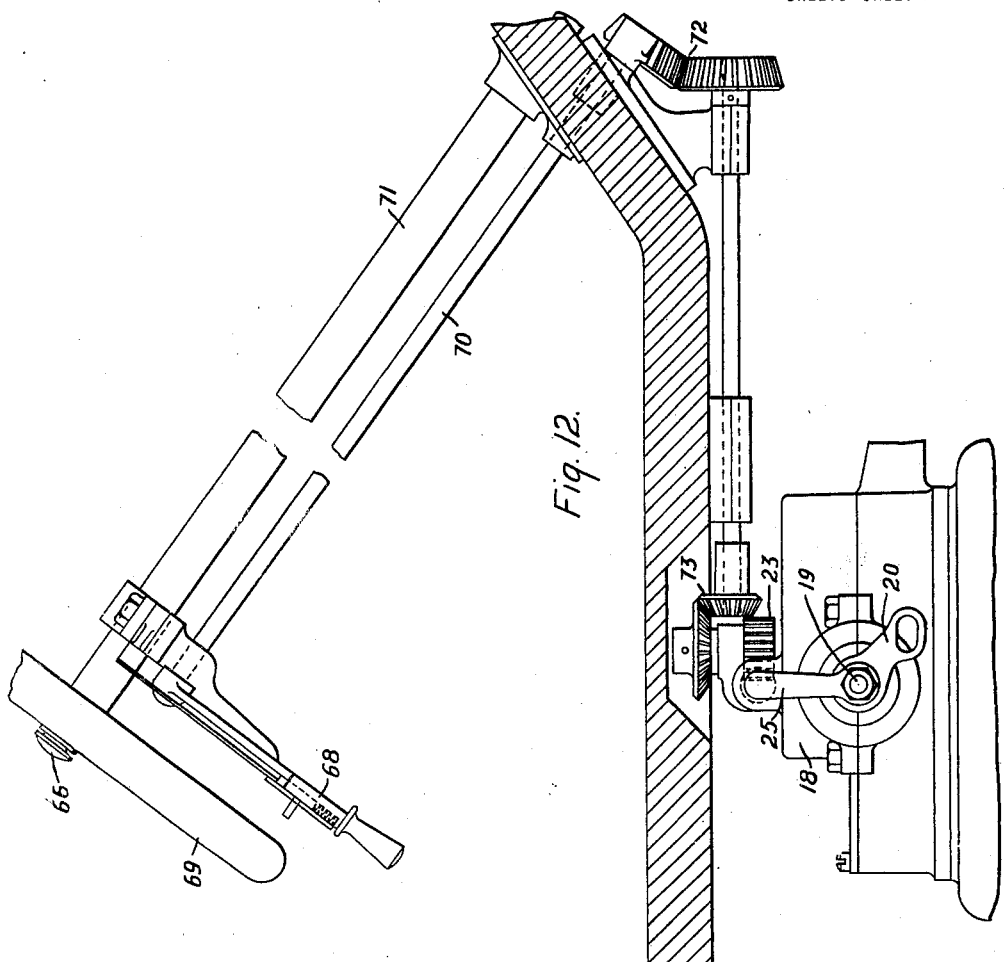

UNITED STATES PATENT OFFICE.

BURTON A. WALRATH, OF SIOUX CITY, IOWA, ASSIGNOR TO WESTINGHOUSE ELECTRIC AND MANUFACTURING COMPANY, A CORPORATION OF PENNSYLVANIA.

GEAR-SHIFTING MECHANISM.

1,371,531.   Specification of Letters Patent.   Patented Mar. 15, 1921.

Application filed January 5, 1917. Serial No. 140,725.

*To all whom it may concern:*

Be it known that I, BURTON A. WALRATH, a citizen of the United States, and a resident of Sioux City, in the county of Woodbury and State of Iowa, have invented a new and useful Improvement in Gear-Shifting Mechanisms, of which the following is a specification.

My invention relates to gear-shifting mechanisms and particularly to operating and controlling mechanisms therefor.

My invention has for one of its objects to provide a simple and efficient means whereby the shiftable members of transmission mechanisms of motor vehicles may be actuated by the power of the prime movers of the vehicles.

A second object of my invention is to provide an arrangement whereby the transmission mechanisms of motor vehicles may be automatically arranged for selected speed ratios upon the initiation of the operation by manually operable members.

A further object of my invention is to provide an arrangement for controlling transmission clutches and transmission mechanisms of motor vehicles in proper sequence during the period of changing speed ratios between the prime movers and the driving wheels.

In the operation of gear-shifting mechanisms that are employed for controlling the transmission mechanisms of automobiles or other motor vehicles, it is customary either to operate them manually after the speed ratio has been selected or to provide separate power devices for actuating the gear-shifting mechanisms.

When either of the above-described types of gear-shifting mechanisms is employed, it is necessary to operate the clutch pedal lever at some time before the movable members of the transmission mechanism are shifted and to effect the engagement of the clutch subsequent to the change in speed ratios. It is difficult to obtain satisfactory results when the sequence of the operation depends upon the judgment and skill of the operator. It is difficult, also, to secure uniformity in successive operations.

I provide an arrangement by means of which the desired speed ratio may be selected in advance of the shifting of the gear wheels. The operation of a train of automatic mechanism for effecting the return of a shifted member to its neutral position and for effecting the shifting of the selected member to an operative position is effected by the operation of a single movable member. The train of mechanism is operatively connected to any suitable rotating part of the engine, such, for example, as the fly wheel or the cam shaft.

The operating mechanism is arranged to remain in operative connection to the engine until a spring for actuating the selected gear wheel to its shifted position has been released, the spring has again been placed under stress and all of the several parts of the operating mechanism have been restored to their initial positions. The operating mechanism is automatically disconnected from the engine at the proper time.

Figure 5:
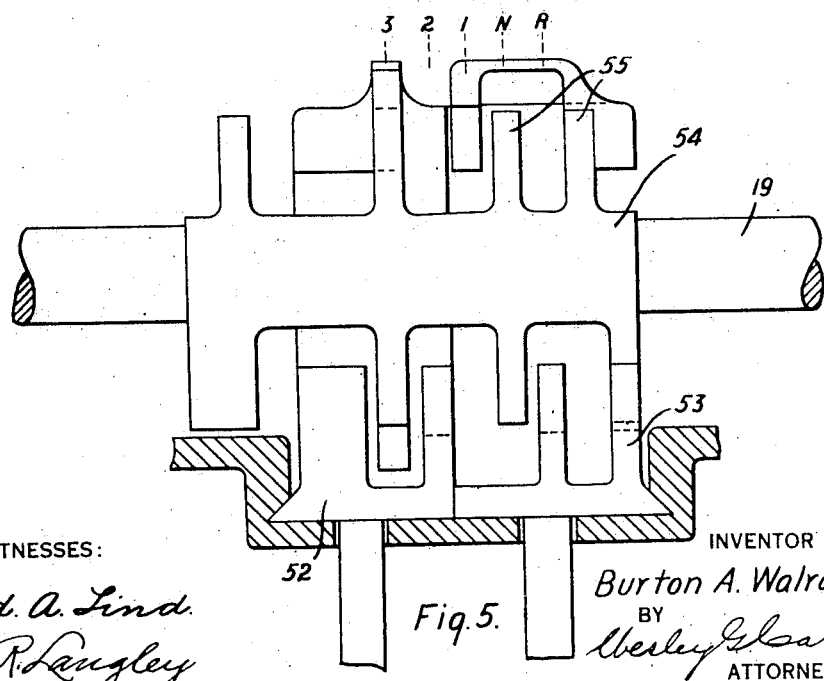
Figure 8:
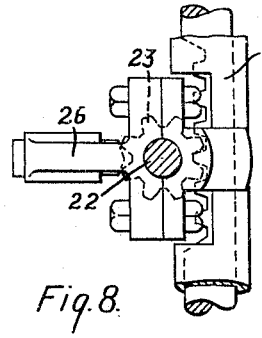
Figure 9:
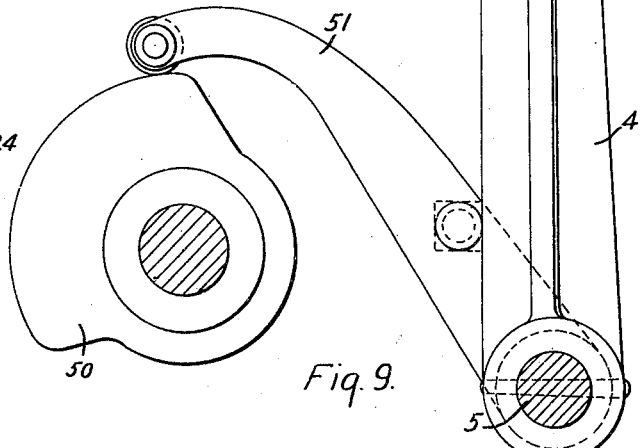
Figures 10, 11:
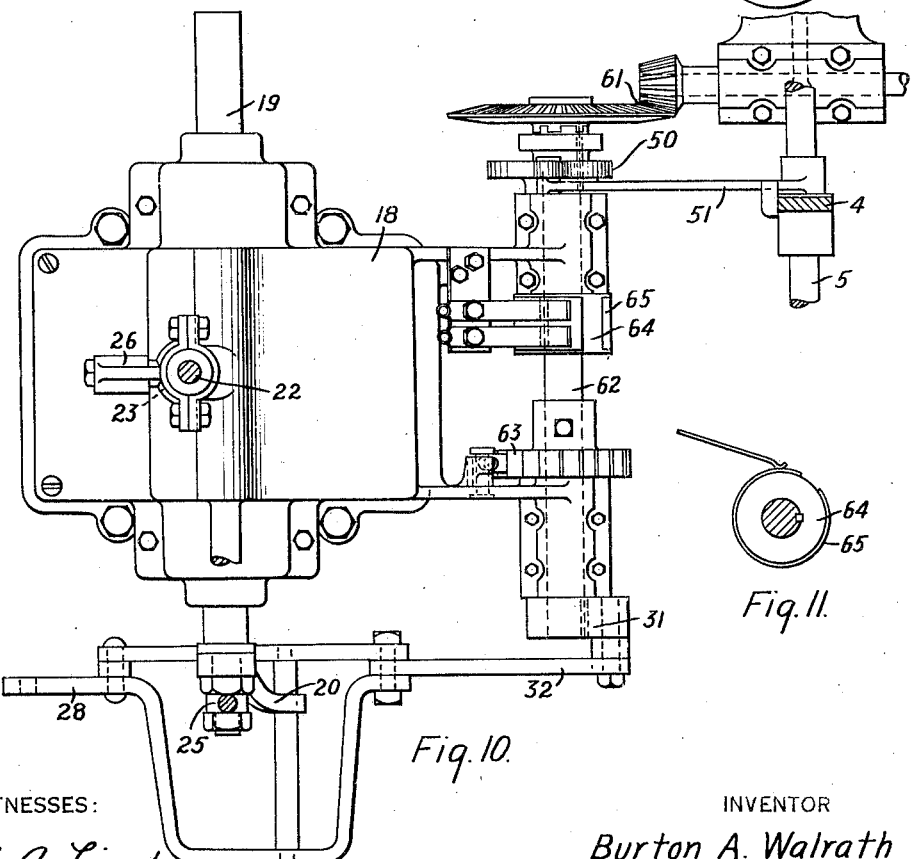

The details of my invention will be described in connection with the accompanying drawings, in which Figure 1 is a view, partially in elevation and partially in section, of a portion of an automobile, with my invention applied thereto. Fig. 2 is a view, partially in plan and partially in section, of a portion of the operating mechanism. Fig. 3 is a view, partially in elevation and partially in section, of the mechanism shown in Fig. 2. Fig. 4 is a side view, partially in elevation and partially in section, of a gear-shifting mechanism employed in connection with my invention, parts being broken away. Fig. 5 is an end view, partially in elevation and partially in section, of the mechanism shown in Fig. 4. Fig. 6 is a view, partially in elevation and partially in section, of a portion of an automobile with a modified form of my invention applied thereto. Fig. 7 is a diagrammatic view of circuits and apparatus employed in connection with the mechanism shown in Fig. 6. Figs. 8 and 9 are views of portions of the operating mechanisms. Fig. 10 is a view, partially in plan and partially in section, of the mechanism shown in Fig. 6. Fig. 11 is an end view of a circuit-controlling device. Fig. 12 is a view, in elevation, of a modified form of mechanism for controlling the gear-shifting mechanism. Fig. 13 is a view, partially in plan and partially in section, of the selecting device shown in Fig. 12.

Referring to Fig. 1 of the drawings, a fly wheel 1, only a portion of which is shown, may be operatively connected, in the usual manner, to an internal-combustion engine (not shown). The fly wheel 1 is provided with a conical recess to constitute a clutch member 2 that coacts with a movable clutch member 3 of corresponding shape. The clutch member 3 is controlled by a pedal lever 4 that is secured to a rock shaft 5.

An arm 6, that is secured to the rock shaft 5, is provided with a bifurcated end portion for engaging projecting portions of a ring 7 that is rotatably mounted upon a grooved member 8. The latter member is rigidly connected to the clutch member 3 and is slidably mounted upon a short shaft 9. A spring 10 normally retains the clutch members 2 and 3 in engagement.

The speed ratio between the shaft 9 and a transmission shaft 12 is controlled by a transmission mechanism 13 which comprises two movable gear wheels 14 and 15. The movable gear wheels are respectively controlled by yoke members 16 and 17 that are operatively connected to a gear-shifting mechanism 18.

The gear-shifting mechanism comprises an operating shaft 19 and an arm 20 that is rigidly connected thereto. The shaft 19 is actuated longitudinally for selecting various speed ratios by a mechanism comprising a manually-operable, rotatable shaft 22, a pinion 23 located at the lower end of the shaft 22, a rack 24, that is best shown in Fig. 8, and an arm 25 that connects the rack 24 to the shaft 19. A spring-pressed plunger 26 coacts with the several teeth of the pinion 23 to yieldingly retain the latter and its connected parts in any positions to which they may be adjusted.

The actuation of the gear-shifting mechanism is effected by means of a strong spring 27 that is connected, at one end, to a suitable stationary part and, at the other end, to a horizontally-extending bar 28 that has a lost-motion connection to the arm 20 of the gear-shifting mechanism. The bar 28 is controlled by mechanism for automatically placing the spring 27 under stress and for releasing the spring at desired times.

The spring-controlling mechanism comprises a rotatable shaft 29 upon which the means for supporting a train of gear mechanism is pivotally mounted. Referring also to Figs. 2 and 3, the shaft 29 is supported by brackets 30 that are secured to, or are integral with, the gear-shifting mechanism. The shaft 29 is operatively connected to the bar 28 by means of a crank arm 31 and a link 32 that has a pin-and-slot connection 33 to the bar 28.

A friction wheel 34, that is adapted to be moved into engagement with the inner face of the fly wheel 1, is connected to a worm shaft 35 that coacts with a worm wheel 36. The worm wheel 36, which is rotatably mounted on the shaft 29, has a lost-motion connection to the latter that is provided by a lug 37 secured to the worm wheel and a coacting lug 38 secured to a collar member 39.

The friction wheel 34 is actuated into engagement with the fly wheel 1 by means of a train of mechanism controlled by the shaft 22. This mechanism comprises a horizontally-extending arm 41, a link 42, and a toggle mechanism 43 that operatively engages the top portion of a frame 44 for supporting the worm shaft 35. When the toggle mechanism 43 is extended, the frame 44 is actuated about the shaft 29, as a pivot, to effect the engagement of the friction wheel 34 and the fly wheel 1. A spring 45 normally retains the frame 44 in such position as to separate these members.

The operative position of the toggle mechanism, which is controlled by the shaft 22, is automatically controlled by a cam 46 that is secured to the shaft 29. The cam 46 engages a projection 47 to maintain the toggle mechanism 43 in engagement with a stop member 48 in order that the gear mechanism connected to the friction wheel 34 and the shaft 29 and its connected parts may be operated through a complete cycle before the wheel 34 is disengaged from the fly wheel 1.

The position of the clutch member 3, during the operation of changing the speed ratio of the transmission mechanism, is controlled by a cam 50 that is mounted on the shaft 29 and an arm 51 that is secured to the rock shaft 5. The clutch members 2 and 3 are accordingly engaged and disengaged in accordance with the position of the shaft 29 and, therefore, in accordance with the point in the cycle of operation of the gear-shifting mechanism.

Reference may now be had to Figs. 4 and 5 in which the gear-shifting mechanism employed in connection with my invention is illustrated. The gear-shifting mechanism 18 is substantially identical with that shown and described in my copending application, Serial No. 824,456, filed March 13, 1914. A detailed description of the device is omitted as being unnecessary to a complete understanding of the present invention. The mechanism comprises a pair of shiftable elements 52 and 43 that are respectively connected to the yoke members 16 and 17, as shown in Fig. 1. The shaft 19 is connected to, or may be cast integral with, a member 54 having a number of radially-extending arms 55 which coact with corresponding portions of the members 52 and 53. The shaft 19 and the member 54 are shifted longitudinally to various positions corresponding to the different speed ratios. When a speed ratio has been selected by means of the mechanism for adjusting the position of the shaft 19, the rotation of the shaft 19 effects the return of the member 52 or the member 53, as the case may be, to its neutral position and effects also the shifting of the member corresponding to the speed ratio selected to its operative position.

The operation of the various mechanisms will now be described. It may be assumed that the engine is in operation and the vehicle in motion. It may be assumed, further, that the transmission mechanism operatively connects the shafts 9 and 12 at any desired speed ratio.

The crank arm 31 occupies a position slightly above its right-hand dead-center position to retain the spring 27 under tension. The spring tends to rotate the shaft 29 in a counter-clockwise direction, but such rotation is prevented by the lugs 37 and 38 which are in engagement and by reason of the fact that the worm-gear mechanism is self-locking.

When it is desired to change the speed ratio, the shaft 22 may be rotated by the operator to shift the shaft 19 longitudinally to the position corresponding to the selected speed ratio. The shaft 22 normally occupies the position indicated by dotted lines in advance of the position in which this member is illustrated. The shaft 22 is actuated rearwardly to its illustrated position to actuate the toggle mechanism 43 and thereby cause the engagement of the friction wheel 34 with the face of the fly wheel 1.

The friction wheel 34 is actuated at a high rate of speed by the fly wheel 1. The shaft 29 is rotated in a clockwise direction, as viewed in Figs. 1 and 3, through the worm-gear mechanism to first effect the disengagement of the clutch members 2 and 3 by means of the cam 50 and the arm 51, the latter being operatively connected to the pedal lever 4. The crank arm 31 is actuated over its dead-center position to a position approximating that illustrated in Fig. 1. The spring 27 is then free to move the bar 28, the arm 20 and the shaft 19, with a relatively quick movement, to effect the shifting of the gear wheel 14 or the gear wheel 15, as the case may be, to the position corresponding to the selected speed ratio. This movement of the bar 28 and the link 32 is permitted by reason of the lost-motion connection between the shaft 29 and the worm gear 36.

The projection 47, which normally engages a recessed portion of the cam 46, is engaged by the cam to maintain the toggle mechanism in the position illustrated in Figs. 1 and 3 until the shaft 29 is again rotated to such position that the recessed portion of the cam registers with the projection 47. The operator may, therefore, release the shaft 22 at any time after the operation of the controlling mechanism has been initiated.

The cam 50 operates substantially immediately upon the shifting of the transmission mechanism to permit the clutch members 2 and 3 to be engaged by the force of the spring 10. The rotation of the shaft 29 continues until it again occupies its initial position, with the spring 27 under tension and the crank arm 31 occupying a position slightly above a horizontal line passing through the axis of the shaft 29. At this point, the recessed portion of the cam 46 registers with the projection 47 and the toggle mechanism 43 is permitted to fall to its normal position. The spring 45 then actuates the frame members 44 and the gear mechanism, comprising the friction wheel 34, in a counter-clockwise direction about the shaft 29 as a pivot. The friction wheel 34 is accordingly disengaged from the fly wheel 1 and actuated into frictional engagement with a stop member 56, which brings it to rest.

Reference may now be had to Figs. 6, 7, 10 and 11 in which a modification of my invention is illustrated. The principal difference between the arrangement described above and the one shown in the views under consideration consists in the means for operatively connecting the controlling mechanism to the internal-combustion engine. An engine 57, only a part of which is shown, has a cam shaft 58 which may be connected to the engine shaft at any suitable speed ratio.

A disk clutch 59, that is controlled by an electromagnet 60, connects the cam shaft 58 to a reduction-gear mechanism 61 which comprises a shaft 62 corresponding to the shaft 29 of the mechanism previously described. A pawl-and-ratchet mechanism 63 operates to maintain the spring 27 under tension. This arrangement is necessary because of the absence of the self-locking worm-gear mechanism employed in the form of my invention first described.

A cylindrical drum 64, that is mounted on the shaft 62, is provided with a contact segment 65 for maintaining the circuit of the electromagnet after the same has been closed by a manually operable push button 66 which may be located at any suitable point near the driver's seat.

It may be assumed that the engine is operating and that the vehicle is being driven at one of the various speed ratios of the transmission mechanism. It may be assumed, further, that a new speed ratio has been selected and that it is desired to shift the transmission mechanism. The push button 66, which is diagrammatically illustrated in Fig. 7, is actuated to close the circuit of the coil of electromagnet 60. The several coacting members of the clutch 59 are actuated into engagement and the gear mechanism 61 rotates the shaft 62 in a clockwise direction, as viewed in Fig. 6.

Upon the actuation of the shaft 62, the drum 64 effects the closing of a circuit for shunting the push button 66, and the latter may be released. This circuit is maintained until the shaft 62 has made a complete rotation and the mechanism has operated through a complete cycle.

The sequence of operation is the same as that described in connection with the controlling mechanism shown in Fig. 1. The engine clutch is disengaged by the cam 50 and the arm 51, the spring 27 is released when the link 32 reaches approximately the position in which it is illustrated, the engagement of the clutch members is effected, and the mechanism operates to again place the spring 27 under tension. When the drum 64 reaches approximately its initial position, the circuit of the coil of electromagnet 60 is open and the members of the clutch 59 are disengaged. The pawl-and-ratchet mechanism 63 operates to retain the various parts in their respective initial positions in readiness for the succeeding operation.

Reference may now be had to Figs. 12 and 13, in which a modified form of mechanism for controlling the gear-shifting mechanism is shown. Similar reference numerals are employed to designate parts corresponding to like parts of the mechanism shown in Fig. 1. The mechanism for operating the gear-shifting mechanism to shift the movable members of the transmission mechanism is omitted as being unnecessary to a complete understanding of this form of my invention.

The shaft 19 of the gear-shifting mechanism 18 is shifted longitudinally by means of a train of mechanism comprising a manually operable lever 68, that is located near the steering wheel 69 of an automobile, a rod 70, that extends substantially parallel to the steering column 71, and bevel gear mechanisms 72 and 73 that are operatively connected to the pinion 23.

The lever 68 coöperates with a quadrant 74 that has notches designated R and N, and 1, 2 and 3, corresponding respectively to reverse, neutral, and first, second and third speeds of the transmission mechanism. A latch 75 engages the various notches in respective positions of the levers 68 to yieldingly retain the latter in the positions to which it is adjusted for selecting the desired speed ratios.

This form of controlling mechanism is especially adapted for use in connection with the mechanism shown in Figs. 6, 7, 10 and 11, in which the mechanism for controlling the spring 27 is operatively connected to the engine by means of an electromagnetically operable clutch 59. The arrangement just described accordingly comprises the push button 66 for controlling the circuit of the electromagnet 60. The push button 66 is preferably located at or near the center of the steering wheel 69.

The operation of the mechanism shown in Figs. 12 and 13 differs in no material respect from that of the mechanisms previously described. When it is desired to change the speed ratio of the transmission mechanism, the lever 68 is adjusted to the position corresponding to the new speed ratio. It is only necessary to depress the push button 66 to cause the movable members of the transmission mechanism to be shifted and the entire mechanism to be operated through the cycle described in connection with the mechanism shown in Figs. 6, 7, 10 and 11.

The arrangements shown and described herein possess a number of operating advantages. It is only necessary to select a new speed ratio in advance of the actual change and to actuate a single movable member in order to initiate the operation of mechanism for automatically disengaging the clutch, effecting the change in gear connections, effecting the engaging of the clutch, and storing energy in a power device in readiness for the succeeding operation.

The various steps of the operation always occur in proper sequence and with a proper time interval between them. In case the teeth of the gear wheels to be meshed do not register properly upon their initial engagement, the spring 27 remains under tension and the meshing is effected immediately upon a slight relative movement of the gear wheels. The above and other advantages will be obvious to those skilled in the art to which my invention appertains.

I claim as my invention:

1. The combination with a driving mechanism and a driven mechanism, of a transmission mechanism for operatively connecting said driving and driven mechanisms, means comprising a resilient member operated by said driving mechanism for storing energy to control said transmission mechanism, and a single member for manipulating said means.

2. The combination with a driving member, a driven member and means comprising a transmission mechanism for operatively connecting said members, of a gear-shifting mechanism for controlling said transmission mechanism, a spring for operating said shifting mechanism, means for operatively connecting said gear-shifting mechanism to said driving member, and means for selecting a desired speed ratio of said transmission mechanism and for placing in operation the said means connecting the gear-shifting mechanism, spring and driving member.

3. The combination with a prime mover, a driven member and means comprising a transmission mechanism for operatively connecting said prime mover to said member, of resilient means operable by the power of said prime mover for controlling said transmission mechanism, and a single device for selecting the desired speed ratio of said transmission mechanism and for initiating the application of said prime mover to said controlling means.

4. The combination with a prime mover, a driven member and means comprising a transmission mechanism for operatively connecting said prime mover to said member, of a gear-shifting mechanism operable by the power of said prime mover for controlling said transmission mechanism, a spring for actuating said shifting mechanism and a single rockable and rotatable device for selecting the desired speed ratio of said transmission mechanism and for operatively connecting said prime mover to said controlling means and spring.

5. The combination with an internal-combustion engine, a driven member and means, comprising a transmission mechanism, for operatively connecting said internal combustion engine to said member, of a driving mechanism comprising an energy storage device between said engine and gear-shifting mechanism for operating the latter, the entire driving mechanism being normally idle.

6. The combination with a prime mover, a driven member and means, comprising a transmission mechanism, for operatively connecting said prime mover to said member, of means for selectively controlling the speed ratio of said transmission mechanism, and normally idle resilient means adapted to engage part of said prime mover for storing energy to actuate said controlling means.

7. The combination with an internal-combustion engine, a driven shaft and means, comprising a transmission mechanism, for operatively connecting said engine to said shaft, of a gear-shifting mechanism for selectively controlling said transmission mechanism, an energy-storage means for operating said shifting mechanism, and manually controlled means for effecting an operative connection of said gear-shifting mechanism to said engine for rendering said storage means operative.

8. The combination with an internal-combustion engine, a driven shaft and means, comprising a transmission mechanism, for operatively connecting said engine to said shaft, of a gear-shifting mechanism for selectively controlling said transmission mechanism, an energy-storage device for operating said shifting mechanism, and means for effecting operative connection of said engine to said gear-shifting mechanism and energy-storage device and automatically controlled for effecting a disconnection of said devices.

9. The combination with an internal-combustion engine, a driven shaft and means comprising a transmission mechanism for operatively connecting said engine to said shaft, of a gear-shifting mechanism for selectively controlling said transmission mechanism, means for storing energy to actuate said shifting mechanism, and means actuated by the power of said engine for successively effecting the shifting of the selected element of said transmission mechanism by stored energy and storing energy for a succeeding shift.

10. The combination with an internal-combustion engine, a driven shaft and means comprising a transmission mechanism, an energy-storage device and a clutch mechanism for operatively connecting said engine to said shaft, of means actuated by said engine for controlling said clutch mechanism and for effecting adjustments of said transmission mechanism and energy-storage device.

11. The combination with an internal-combustion engine, a driven shaft and means comprising a transmission mechanism, an energy-storage device and a clutch mechanism for operatively connecting said engine to said shaft, of means actuated by said engine for successively effecting the disengagement of said clutch mechanism, the shifting of said transmission mechanism, the engagement of the clutch mechanism and resetting of said storage device.

12. The combination with an internal-combustion engine, a driven shaft and means comprising a transmission mechanism and a clutch mechanism for operatively connecting said engine to said shaft, of a gear-shifting mechanism for selectively controlling said transmission mechanism, an energy-storage device for actuating said gear-shifting mechanism, and means actuated by said engine for controlling said clutch mechanism and said device.

13. The combination with an internal-combustion engine, a driven shaft and means comprising a transmission mechanism and a clutch mechanism for operatively connecting said engine to said shaft, of a gear-shifting mechanism for selectively controlling said transmission mechanism, an energy-storage device for actuating said gear-shifting mechanism, and means actuated by said engine for successively effecting the disengagement of the clutch mechanism, the rerelease of the device, the engagement of the clutch mechanism and the storage of energy in said device.

14. The combination with an internal-combustion engine, a driven shaft and means comprising a transmission mechanism and a clutch mechanism for operatively connecting said engine to said shaft, of a gear-shifting mechanism for controlling said transmission mechanism, a spring for actuating said gear-shifting mechanism, and means for operatively connecting said spring and said gear-shifting mechanism to said engine.

15. The combination with an internal-combustion engine, a driven shaft and means comprising a transmission mechanism and a clutch mechanism for operatively connecting said engine to said shaft, of a gear-shifting mechanism comprising an operating member for controlling said transmission mechanism, a spring for actuating said member in one direction and means operatively connected to said engine for actuating said member in the other direction and for storing energy in said spring.

16. The combination with an internal-combustion engine, a driven shaft and means comprising a transmission mechanism and a clutch mechanism for operatively connecting said engine to said shaft, of a gear-shifting mechanism comprising an operating member for controlling said transmission mechanism, a spring for actuating said member in one direction and means operatively connected to said engine for successively effecting the disengagement of the clutch mechanism, the actuation of said member by said spring, the engagement of the clutch mechanism and the storing of energy in said spring.

17. The combination with an engine, a driven shaft and means comprising a transmission mechanism for operatively connecting said engine to said shaft, of a gear-shifting mechanism for controlling said transmission mechanism, a spring for actuating said shifting mechanism, means for controlling said gear-shifting mechanism adapted to be actuated manually into operative engagement with a part of said engine, and means for automatically effecting disconnection of said controlling means from said engine.

18. The combination with an engine, a driven shaft and means comprising a transmission mechanism for operatively connecting said engine to said shaft, of a gear-shifting mechanism for controlling said transmission mechanism, a spring for actuating said shifting mechanism, means for controlling said gear-shifting mechanism adapted to be actuated manually into operative connection to said engine, and means for automatically effecting disconnection of said controlling means from said engine upon the completion of a definite cycle of operation.

19. The combination with an engine, a driven shaft and means comprising a transmission mechanism for operatively connecting said engine to said shaft, of a gear-shifting mechanism for controlling said transmission mechanism, means for controlling said gear-shifting mechanism, said means comprising a member having a lost-motion connection to said gear-shifting mechanism and adapted to be actuated into operative connection to said engine.

20. The combination with an engine, a driven shaft and means comprising a transmission mechanism for operatively connecting said engine to said shaft, of a gear-shifting mechanism for controlling said transmission mechanism, means for controlling said gear-shifting mechanism, said means comprising an actuating spring, a member for operatively connecting said spring to said gear-shifting mechanism and a member having a lost-motion connection to said connecting member and adapted to be operatively connected to said engine.

In testimony whereof, I have hereunto subscribed my name this 19th day of December, 1916.

BURTON A. WALRATH.